United States Patent [19]

Nolan

[11] Patent Number: 4,529,516
[45] Date of Patent: Jul. 16, 1985

[54] SELF-FLUSHING MAGNETIC SEPARTOR

[75] Inventor: John J. Nolan, W. Wareham, Mass.

[73] Assignee: Sala Magnetics, Inc., Cambridge, Mass.

[21] Appl. No.: 194,995

[22] Filed: Oct. 8, 1980

Related U.S. Application Data

[63] Continuation of Ser. No. 39,671, May 16, 1979, abandoned, which is a continuation of Ser. No. 912,542, Jun. 5, 1978, abandoned.

[51] Int. Cl.³ ............................................. B01D 35/06
[52] U.S. Cl. .................................. 210/222; 210/410; 210/411
[58] Field of Search ........ 210/108, 222, 223, 409–412, 210/420, 425, 426, 427, 450, 453, 455, 456; 55/100, 302

[56]         References Cited
U.S. PATENT DOCUMENTS 2,714,455  8/1955  Galloway ..................... 210/450 X
3,343,676  9/1967  Tyrrell ......................... 210/108 X
4,025,432  5/1977  Nolan et al. ..................... 210/222
4,087,358  5/1978  Oder .............................. 210/222 X

OTHER PUBLICATIONS

Chemical Engineer's Handbook, p. 1203, John H. Perry, Editor, Third Ed., McGraw-Hill Book Co., 1950.

Primary Examiner—David Sadowski
Attorney, Agent, or Firm—Arthur M. Streich; Lee H. Kaiser

[57]         ABSTRACT

A self-flushing, magnetic separator technique including feeding the medium to be separated to one end of a matrix in a container; collecting separated fluid from the other end of the matrix; accumulating at least one matrix volume of the separated fluid in a chamber in the container adjacent one of the ends of the matrix stopping flow to and from the matrix, trapping the accumulated fluid in the chamber; and in one embodiment introducing a pressurized drive fluid to the chamber and venting the other end of the matrix to urge the accumulated fluid to move through and flush the matrix.

5 Claims, 5 Drawing Figures

SELF-FLUSHING MAGNETIC SEPARTOR

This is a continuation of application Ser. No. 039,671, filed May 16, 1979, now abandoned, which was a continuation of application Ser. No. 912,542 filed June 5, 1978, now abandoned.

FIELD OF INVENTION

This invention relates to a method of self-flushing of a magnetic separator and a self-flushing magnetic separator apparatus.

BACKGROUND OF INVENTION

Presently magnetic separators may be cleaned by back-flushing through the matrix: introducing the flush fluid through the outlet at the downstream end of the matrix and recovering it at the inlet after exit from the upstream end. The flush fluid is stored in a holding tank downstream of the separator and may be either the fluid output from the separator or an externally supplied cleansing fluid. This requires an additional pipeline to interconect the holding tank with the outlet of the separator if a separate cleaning fluid is used, or an enlarged collection pipe if the fluid collected from the separator is used for flushing. In either case the pipe requires at least two bends if, as is normally necessary, the holding tank is not to interfere with access to the separator. These bends severely reduce the energy of the flushing flow and the added length or diameter of the outlet pipe increase the apparatus cost. The high-energy fluid flow approaching the downstream end of the matrix through the outlet also requires some type of baffle in or at the outlet to distribute the flush fluid over the entire matrix area, and not just the area beneath the outlet. This further depletes the energy of the fluid at the matrix. The flushing fluid, be it externally or internally derived, is normally driven out of the holding tank and back into and through the matrix by a surge of high-pressure fluid such as air. This requires another holding tank to store the pressurized driving fluid. To improve the flushing action, air or some other fluid is distributed through the flush fluid by means of nozzles or the like in the outlet pipe to perturb the flush fluid. However, the means for distributing the perturbing agent in the outlet interferes with and further impedes the flush fluid on the way to back-flush the matrix and is relatively ineffective in mixing the perturbing agent with the flush fluid.

SUMMARY OF INVENTION

It is therefore an object of this invention to provide an improved, simpler, less expensive and more effective flushing method for a magnetic separator.

It is a further object of this invention to provide such a method which eliminates the need for additional flush fluid storage means, interconnecting conduit and baffles, and increases the available energy of the flush fluid at the matrix.

It is a further object of this invention to provide such a method which in one variation enables broader introduction of a perturbation agent in the flush fluid without baffles or similar elements.

It is a further object of this invention to provide such a method which in another variation enables high-pressure flushing with perturbed flush fluid while eliminating the need for a high-pressure holding tank and driving fluid and the need for a perturbation agent.

It is a further object of this invention to provide an improved, more compact, less expensive, simpler and more efficient self-flushing magnetic separator system.

The invention results from the realization that the flush fluid holding tank, connecting pipes of enlarged diameter, and the associated losses may be totally eliminated by accumulating in the magnetic separator itself the flush fluid to be used to flush the matrix, and that in high-temperature and pressure systems the drive fluid and perturbing agent may be eliminated and the flush achieved by means of boiling action wherein the increasing vapor volume drives the flush fluid self-perturbated by the boiling action.

The invention features a self-flushing magnetic separator method. The medium to be separated is fed to one end of the matrix in a container and the separated fluid is collected at the other end of the matrix. At least one matrix volume of fluid is accumulated in a chamber adjacent one of the ends of the matrix. The flow of the medium through the matrix is stopped. There is introduced to the chamber pressurized drive fluid and the other end of the matrix is vented to urge the accumulated fluid to move through and flush the matrix.

Alternatively, when the system is operated with a liquid feed medium sufficiently above ambient pressure and temperature, there is no need for the introduction of a pressurized drive fluid to urge the accumulated fluid through the matrix. Under those circumstances, venting the matrix lowers the pressure in the vessel and causes the accumulated liquid to flash or boil and establish increased vapor volume with the boiling liquid to drive it through the matrix and flush the matrix with the boiling liquid.

The invention also includes an apparatus in the form of a self-flushing magnetic separator system capable of carrying out the inventive method. The system includes a container and matrix means including a matrix fixably disposed in the container. A chamber in the container adjacent one end of the matrix has a volume of at least one matrix volume for accumulating fluid. There are valve means at each end of the container for stopping feed flow through the matrix, trapping the fluid in the chamber and venting the matrix for flushing.

The system may also include a high-pressure source of perturbing fluid, a distributor disposed in the chamber for distributing the perturbing fluid, and means interconnecting the distributor with the high-pressure source for introducing the perturbing fluid at high pressure into the flush fluid. The container may include a housing, a cover, and means for fastening them together; and the matrix means may further include first and second pole members, one disposed proximate one end of the matrix and fixed to the housing, the other disposed proximate the other end of the matrix and fixed to and spaced from the cover with the chamber in between that pole member and the cover; and the matrix fixed in position.

DISCLOSURE OF PREFERRED EMBODIMENT

Other objects, features and advantages will occur from the following description of a preferred embodiment and the accompanying drawings, in which.

Figure 1:
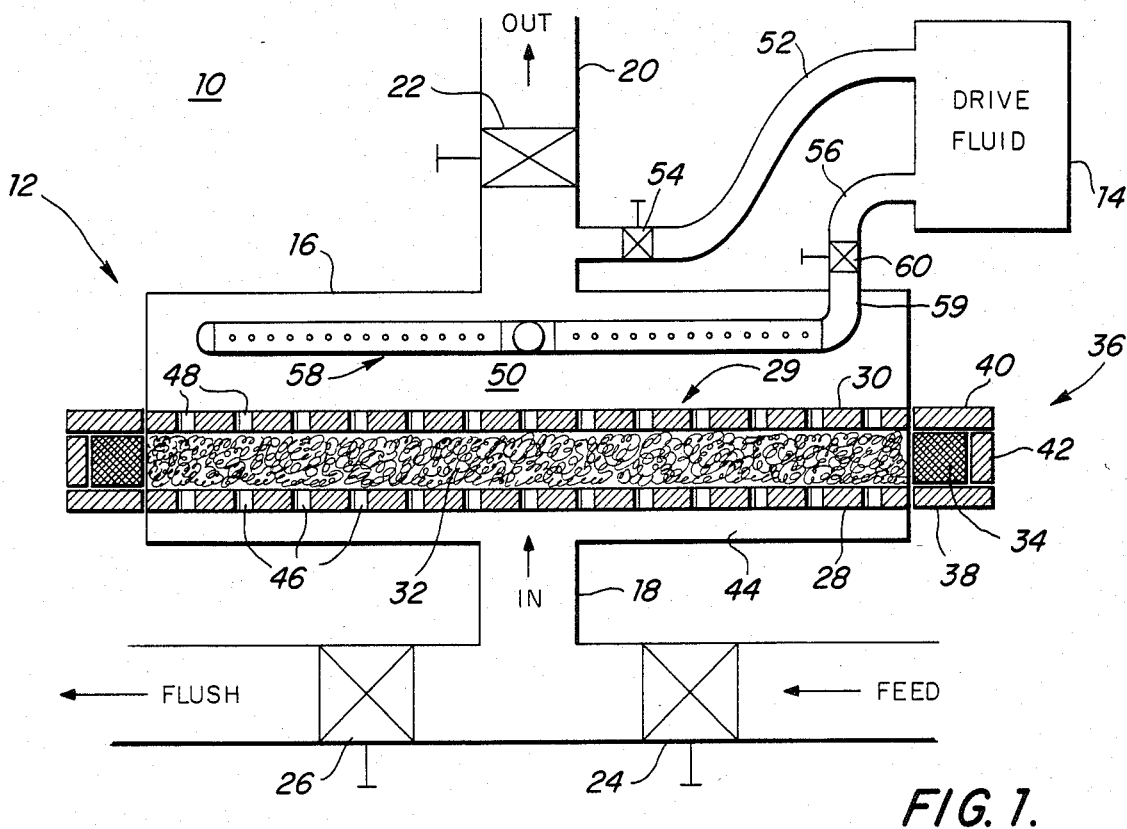
FIG. 1 is a schematic diagram of a self-flushing magnetic separator system according to this invention.

The invention may be accomplished with a self-contained back-flushing magnetic separator system including a container with an inlet and outlet, including a matrix fixably disposed in the container. There is a chamber in the container adjacent the downstream end of the matrix between the matrix and the outlet, which chamber has a volume of at least one matrix volume, preferably two or more, for accumulating fluid from the matrix. A first valve means at the outlet downstream of the chamber controls flow from the chamber, and a second valve means at the inlet upstream end of the matrix controls the feed flow to the matrix and back-flush flow from the matrix.

The system may also include a high-pressure source of a perturbing agent or fluid, a distributor disposed in the chamber for distributing the perturbing agent or fluid, and means interconnecting the distributor with the high-pressure source for introducing the perturbing fluid at high pressure into the flush fluid.

Structurally, the container may include a housing and a cover with means for fastening together the housing and cover. The matrix means further may include first and second pole members, one disposed proximate one end of the matrix and fixed to the housing, the other disposed proximate the other end of the matrix and fixed to and spaced from the cover, with the chamber formed between the cover and that pole member. Each of the pole members includes holes or other passages through which the fluid passes to and from the matrix. Preferably the container and matrix are oriented vertically with the chamber above the matrix.

The method of the invention, includes a back-flushing method which includes feeding the medium to be separated through an inlet to the upstream end of a matrix and collecting the separated fluid through an outlet from the downstream end of the matrix. The method also includes accumulating at least one matrix volume of the separated fluid adjacent the downstream end of the matrix between the matrix and the outlet and then closing the outlet and entrapping the accumulated fluid between the matrix and the outlet.

The flow of the medium to the upstream end of the matrix is stopped. There is introduced pressurized drive fluid at the outlet and the upstream end of the matrix is vented to a flush outlet to urge the accumulated fluid to move upstream and back-flush the matrix. A perturbing fluid may be introduced into the accumulated flushing fluid at increased pressure to increase the turbulence in the flushing fluid as it back-flushes the matrix.

In one embodiment the feed flow is in the range of 900 m³ per hour, and it is desired to reduce from 100 ppm to 10 ppm impurities in a flue gas scrubber effluent at normal ambient pressure, 1 atmosphere, and temperature, 20° C. Air may be used as the drive fluid at 5 atmospheres pressure to move the flush fluid through the matrix. Air at the same 5 atmosphere pressure from the same storage tank having a flow of 4000 m³ per hour standard may be used to perturbate the flush fluid, resulting in a back-flush flow of an approximately equal mixture of air and flush fluid at 9000 m³ per hour.

Alternatively, a self-contained back-flushing method may be used for liquid feed sufficiently above ambient pressure and temperature, in which the feed is delivered and the separated liquid collected at above ambient pressure and temperature. Accumulated adjacent the downstream end of the matrix between the matrix and outlet is at least one matrix volume of the separated liquid at above ambient pressure and temperature. The outlet is closed to trap the accumulated separated liquid between the matrix and the outlet. The flow of the medium at the upstream end of the matrix is stopped and the upstream end of the matrix is vented to lower pressure, causing the accumulated liquid to boil and establish increased vapor volume downstream of the boiling liquid to drive it upstream through the matrix and back-flush the matrix with the self-perturbed boiling liquid.

By sufficient pressure and temperature above ambient is meant a range of combinations of temperature and pressure at which the internal energy of the liquid is adequate to produce flashing or boiling as the system pressure is decreased toward ambient or whatever pressure to which the system is flushed. Consequently a unit volume of liquid is converted to many units of volume of vapor, whereby this increasing volume of vapor drives the boiling liquid through the matrix.

For example, with a flow rate of 900 m³ per hour at 1000 psia and 475° F., a decrease in pressure to 540 psia, approximately the saturation point of water at 475° F., causes the boiling to begin and a large vapor volume to be created. The violent turbulence associated with the boiling helps clean the matrix, and the increasing volume created above it forces the boiling liquid/vapor mixture down through the matrix. When the pressure drops to approximately 400 psia under these conditions, the fluid contained in the container is essentially all vapor and the flushing process can be stopped and the feed cycle begun again.

There is shown in FIG. 1 a self-contained back-flushing separator system 10 which includes separator 12 and a drive fluid storage tank 14. Separator 12 includes a container 16 having an inlet 18 and an outlet 20. An outlet valve 22 controls flow out of container 16, while an inlet feed valve 24 controls flow of feed in inlet 18 and a flush outlet valve 26 controls the exit of back-flush fluid through inlet 18. The valve means 24 and 26 could be supplanted by a single two-way valve if desired. Separator 12 includes a matrix unit 29 having a lower inlet pole member 28 and upper outlet pole member 30 with matrix 32 between them. The magnetic field in matrix 32 is supplied by annular electromagnetic coil 34 through magnetic return frame 36 which includes lower, 38, and upper, 40, plates, annular extensions of pole members 28 and 30, respectively, and a circumferential member 42. Feed entering inlet 18 flows into plenum 44 through holes 46 in inlet pole member 28, through matrix 32 and out through holes 48 in outlet pole member 30, where the separated fluid is collected in chamber 50, which is at least equivalent to one matrix volume and preferably is capable of accumulating two or more matrix volumes. Drive fluid storage tank 14 has associated with it a drive fluid conduit 52, through which the pressurized drive fluid is delivered to outlet 20 under the control of valve 54. The drive fluid storage tank 14 may also be used as the supply of the perturbing agent or fluid through conduit 56, whose output to distributor 58 is controlled by valve 60.

In operation, flush valve 26 is normally closed and feed valve 24 open, allowing feed to move through inlet 18 and through matrix 32. After separation, the separated fluid accumulates in chamber 50 and is collected in outlet 20 through open outlet valve 22. Periodically, when a matrix becomes loaded the magnet is de-energized, outlet valve 22 is shut, feed valve 24 is shut, flush valve 26 is opened, and valve 54 is opened, permitting high-pressure drive fluid to be introduced to chamber 50, driving the accumulated fluid in chanber 50 back upstream from the downstream side of matrix 32 to the upstream side of matrix 32 and out through flush outlet valve 26.

If desired, a perturbing agent or fluid such as the drive fluid itself, for example air, is introduced through distributor 58 to the separated fluid in chamber 50 in order to increase its turbulence as it moves backward from the downstream side to the upstream side of matrix 32.

Alternatively, distributor 58, valve 60, conduit 56, valve 54, and conduit 52, along with storage tank 14, may be eliminated when system 10 is being operated at high temperature and high pressure. In that case, after the closing of valves 22 and 24, the opening of flush valve 26 causes boiling to occur in container 16. The boiling provides its own perturbing influence to increase the turbulence of the fluid in matrix 32. The increasing vapor volume developed in container 16 by the boiling action drives the boiling fluid back from the downstream side to the upstream side of the matrix.

Figure 2:
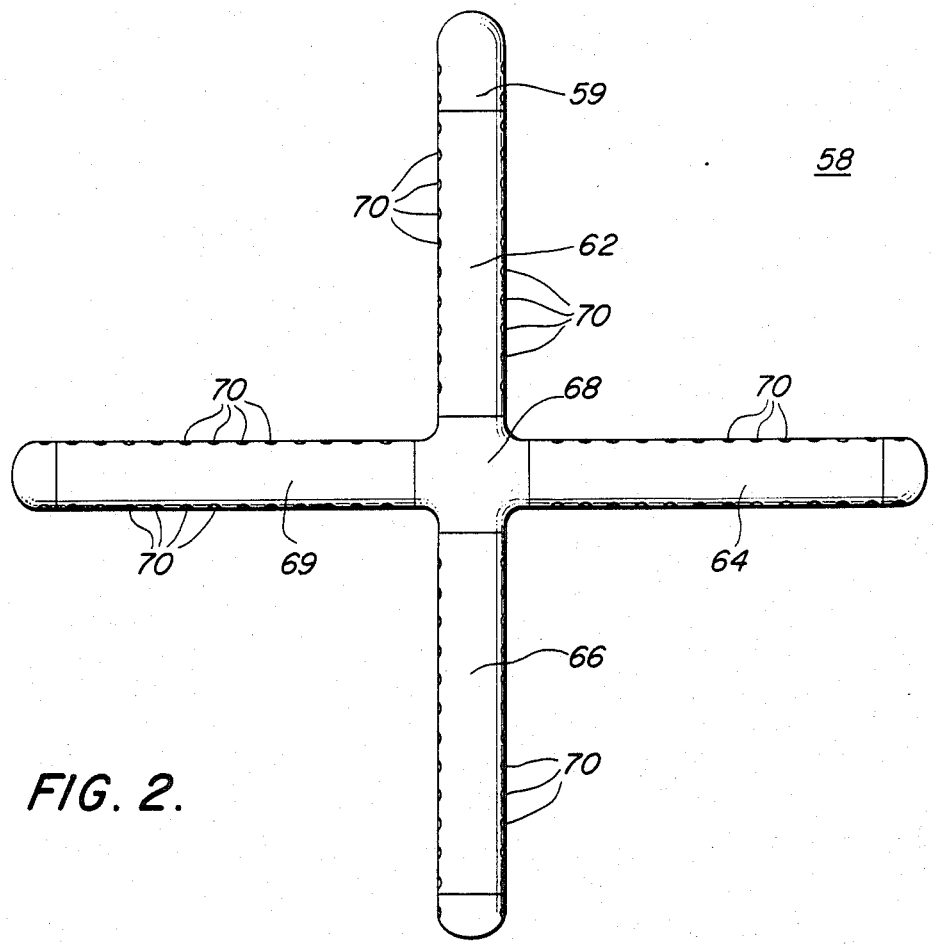
FIG. 2 is a more detailed plan view of a distributor shown in FIG. 1.

Distributor 58, FIG. 2, may include an inlet portion 59 interconnected with conduit 56 through valve 60 and a main conduit 62 and a number of additional conduits 64, 66, and 69 fed by main conduit 62 through a distributor head 68. Each of conduits 62, 64, 66 and 69 includes a plurality of holes 70 through which the perturbing fluid is introduced into the flushing fluid accumulated in chamber 50.

Figure 3:
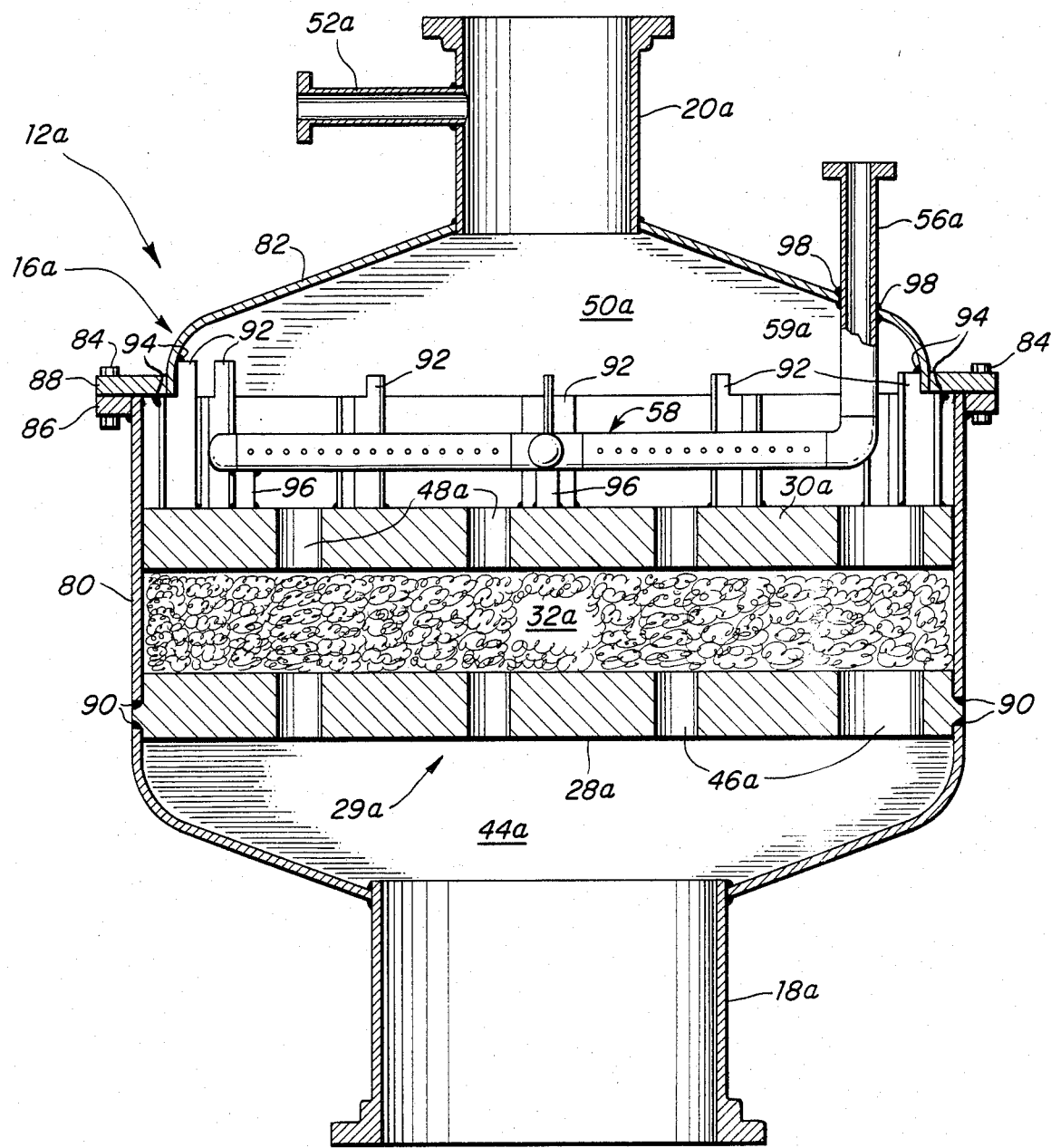
FIG. 3 is a more detailed diagrammatic cross-sectional view of the magnetic separator portion of the system of FIG. 1.

In FIG. 3, where like parts have been shown with like numbers accompanied by a lower case a with respect to FIG. 1, magnetic separator 12a is shown formed of a container 16a which includes a housing 80 and cover 82 attached by bolts 84 through their respective flanges 86, 88. Pole member 28a of matrix unit 29a is fastened directly to housing 80, such as by welding in areas 90. Pole member 30a is fixed to and spaced from cover 82 by means of longitudinally oriented T-shaped steel girders 92 which are welded at their lower ends to pole member 30a and at their upper ends to the inner portion of flange 88, such as at weld points 94. Thus matrix 32 is fixed in position and cannot be dislodged during feeding or flushing. Distributor 58 is supported by bars 96 fixed to pole member 30a and by being fastened directly to cover 82 such as at welds 98.

Figure 4:
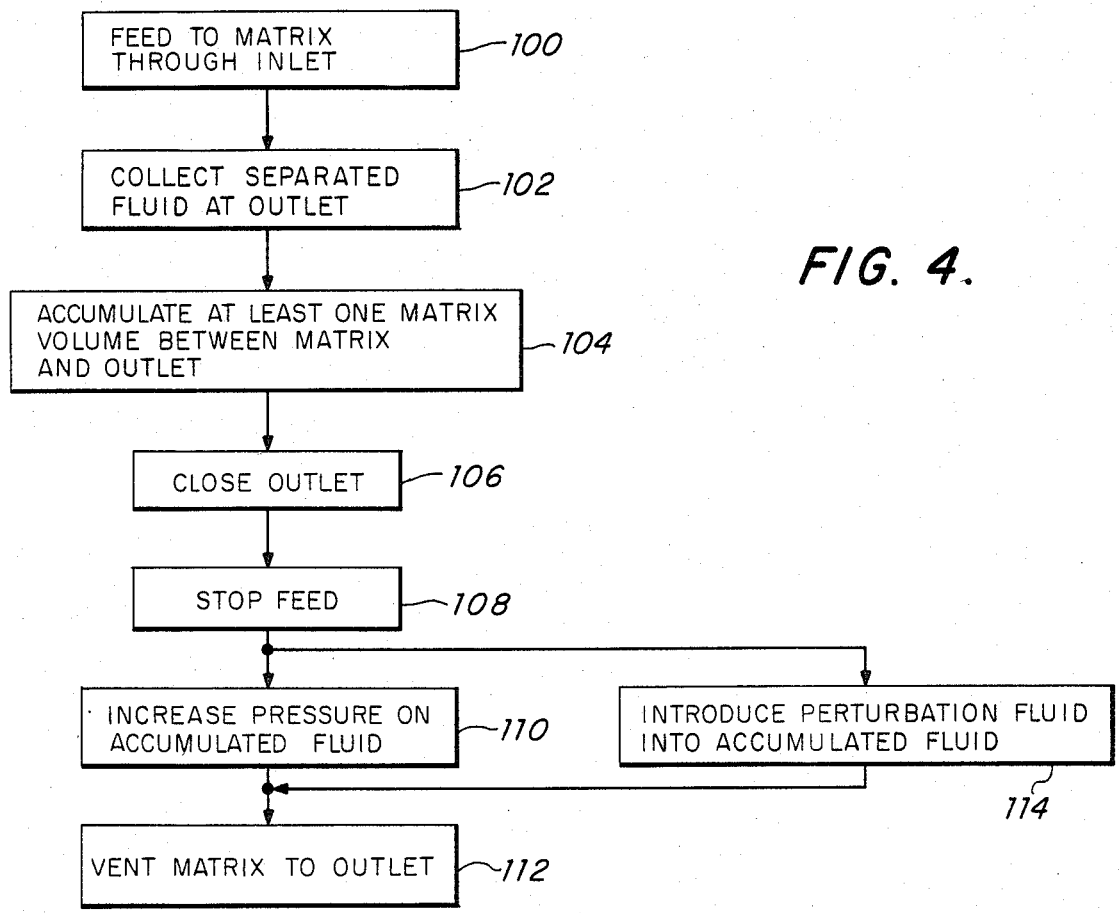
FIG. 4 is a chart showing one self-contained flushing method according to this invention.
Figure 5:
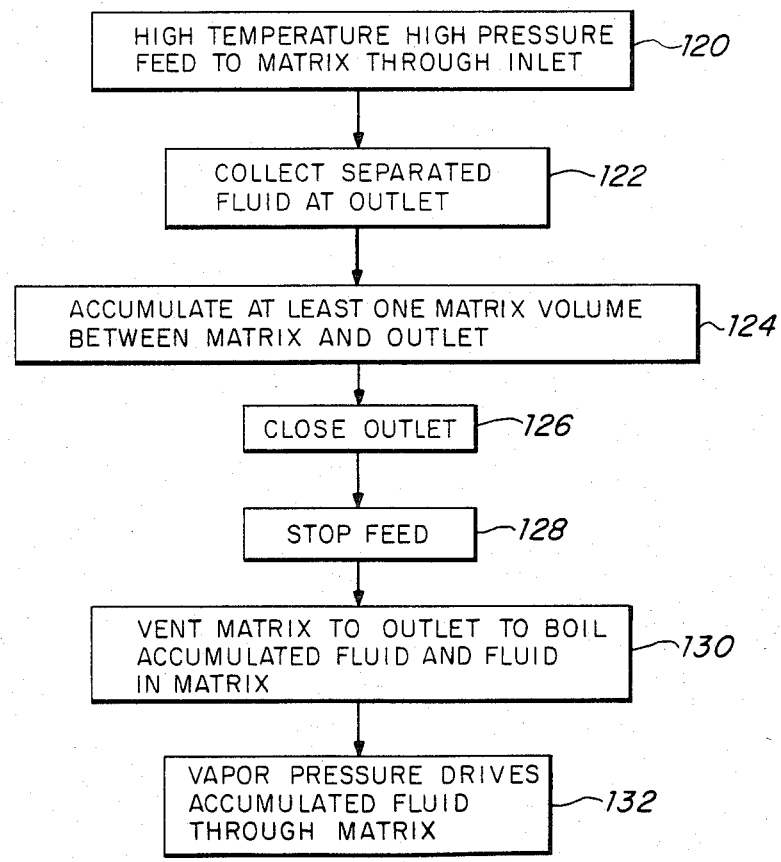
FIG. 5 shows an alternative self-contained flushing method according to this invention.

The method of this invention requires delivery feed to the matrix through an inlet 100, FIG. 4, and collecting the separated fluid at the outlet 102, and accumulating the equivalent of one matrix volume or more between the matrix and the outlet on the downstream side of the matrix 104. Periodically when the matrix efficiency begins to suffer from loading, the magnet is de-energized, the outlet is closed, 106, and the feed is stopped, 108. A pressure increase is then introduced to the accumulated fluid, 110, to drive it back through the matrix, 112, and the matrix outlet is vented to permit the back-flushing to occur.

Additionally, for improved cleansing action, a perturbation fluid may be introduced into the accumulated flushing fluid, 114, to increase the turbulence of this fluid as it is back-flushed through the matrix.

Alternatively, in high-temperature high-pressure operations, an improved method similarly requires that feed be delivered to the matrix through the inlet 120 and the separated fluid collected at the outlet 122. An accumulation of the equivalent of at least one matrix volume or more is made between the downstream side of the matrix and the outlet 124. Periodically, when the matrix efficiency suffers from loading, the magent is deenergized, the outlet is closed, 126, and the flow of feed is stopped, 128. The matrix is then slowly vented to an outlet 130 to cause the accumulated fluid to boil, both in the accumulation chamber and in the matrix. The boiling increases the turbulence, an aid in cleansing the matrix, and also produces increasing vapor volume above the boiling liquid which forces it back through the matrix and out through the flush outlet, 132.

Other embodiments will occur to those skilled in the art and are within the following claims:

What is claimed is:

1. A self-flushing magnetic separator system comprising: a hollow closed container having a housing, a cover, means for fastening together said housing and said cover, an inlet for feed liquid and an outlet for separated liquid; matrix means including a ferromagnetic matrix and first and second magnetic pole members on opposite sides of said matrix disposed in said container between said inlet and said outlet; said first and second magnetic pole members having passages therein for flow of fluid to and from the matrix; a chamber in said container between said second pole member and the outlet and having a volume of at least one matrix volume for accumulating separated liquid; first valve means at the outlet downstream of the matrix for controlling flow of separated liquid through the outlet and for trapping separated liquid accumulated within said chamber when said first valve means is closed; second valve means at the inlet for controlling feed liquid flow through the inlet to said matrix and for venting an upstream end of said matrix for flushing; a high pressure source of gaseous drive fluid, and means including third valve means for selectively introducing said drive fluid from said high pressure source into said chamber for driving the accumulated separated liquid trapped within said chamber between said second pole member and said outlet, which is closed when said first valve means is closed, back through said matrix to flush said matrix; and said first pole member is disposed proximate the upstream end of said matrix and fixed to said housing and said second pole member is disposed proximate a downstream end of said matrix and fixed to and spaced from said cover with said chamber between said second pole member and said cover, whereby said matrix is readily accessible upon removal of said cover to which said second pole member is attached.

2. The system of claim 1 in which said chamber has at least twice the matrix volume, and including a distributor affixed to said cover within said chamber, and conduit means connected at one end to said distributor within said housing and affixed to and extending through said cover and adapted to be connected at its other end exterior of said housing to said source of gaseous drive fluid.

3. The system of claim 1 wherein said second valve means includes inlet valve means for controlling flow of feed fluid through the inlet to the matrix and flush valve means for controlling exit of back-flushing fluid through the inlet.

4. The system of claim 1 having an annular electromagnetic coil surrounding said matrix means exterior of said container and an annular magnetic return frame surrounding said coil exterior of said container and wherein said annular magnetic return frame has first and second portions on opposite sides of said coil coplanar with said first and second pole members, respectively, and a third circumferential portion surrounding said coil and connecting said first and second portions.

5. A back-flushing magnetic separator system comprising: a hollow closed container having a housing, a cover, means for fastening together said housing and cover, an inlet for feed liquid and an outlet for separated liquid; a ferromagnetic matrix within said container; means including first and second magnetic pole members within said container on opposite sides of said matrix for selectively establishing a magnetic field in and removing said magnetic field from said matrix; a chamber in said container adjacent a downstream end of the matrix between said second pole member and said outlet and having at least one matrix volume for accumulating separated liquid from the matrix; said first and second magnetic pole members having passages therein for flow of fluid to and from the matrix; first valve means at the outlet downstream of said chamber for controlling flow of separated liquid from the chamber through the outlet and for trapping separated liquid within said chamber when said first valve means is closed; second valve means at the inlet upstream of the matrix for controlling feed liquid through the inlet to the matrix and for also venting the matrix through the inlet for back flushing, a high pressure source of a gaseous drive fluid; and means including third valve means for selectively introducing said drive fluid from said source into said chamber for driving the accumulated separated liquid trapped within said chamber between said second pole member and said outlet, which is closed when said first valve means is closed, back through said matrix to flush said matrix; and said first pole member is disposed proximate an upstream end of said matrix and fixed to said housing, and said second pole member is disposed proximate the downstream end of the matrix and fixed to and spaced from said cover with said chamber between said second pole member and said cover, whereby said matrix is readily accessible upon removal of said cover to which said second pole member is attached, and said matrix further includes an annular electromagnetic coil surrounding said matrix exterior of said housing and an annular magnetic return frame exterior of said housing having first and second portions on opposite sides of said coil coplanar with said first and second pole members, respectively, and a third circumferential portion connecting said first and second portions.

* * * * *